April 16, 1963

T. B. APPEL, JR., ET AL

3,085,641

BATCHER CONTROL MECHANISM

Filed Aug. 17, 1955

INVENTORS
THEODORE B. APPEL, JR.
HOWARD C. ROBERTS

BY

ATTORNEY

April 16, 1963  T. B. APPEL, JR., ET AL  3,085,641
BATCHER CONTROL MECHANISM
Filed Aug. 17, 1955  6 Sheets-Sheet 2

INVENTORS
THEODORE B. APPEL, JR.
HOWARD C. ROBERTS
BY
ATTORNEY

April 16, 1963 T. B. APPEL, JR., ET AL 3,085,641
BATCHER CONTROL MECHANISM
Filed Aug. 17, 1955 6 Sheets-Sheet 4

INVENTORS
THEODORE B. APPEL, JR.
HOWARD C. ROBERTS
BY
ATTORNEY

April 16, 1963  T. B. APPEL, JR., ET AL  3,085,641
BATCHER CONTROL MECHANISM
Filed Aug. 17, 1955  6 Sheets-Sheet 5

INVENTORS
THEODORE B. APPEL, JR.
HOWARD C. ROBERTS
BY
ATTORNEY

April 16, 1963 T. B. APPEL, JR., ET AL 3,085,641
BATCHER CONTROL MECHANISM
Filed Aug. 17, 1955 6 Sheets-Sheet 6

INVENTORS
THEODORE B. APPEL, JR.
HOWARD C. ROBERTS
BY
ATTORNEY

United States Patent Office 3,085,641
Patented Apr. 16, 1963

3,085,641
BATCHER CONTROL MECHANISM
Theodore B. Appel, Jr., and Howard C. Roberts, Champaign, Ill., assignors, by mesne assignments, to Koehring Company, Milwaukee, Wis., a corporation of Wisconsin
Filed Aug. 17, 1955, Ser. No. 528,974
8 Claims. (Cl. 177—103)

The present invention relates to batcher control mechanism having particular utility in the field of batching materials for concrete.

As is well known in the art, the proportioning of ingredients such as sand, cobbles, and cement in the making of concrete is varied in accordance with the use to be made of the concrete. It is desirable in the case of a batcher intended for a large construction project or for use in a high speed ready-mix plant that provision be made for rapid selection of any one of a number of predetermined mixes and that each ingredient in a mix be weighed out with a high degree of accuracy.

In the prior U.S. Patent 2,559,307, issued to E. O. Martinson on July 3, 1951, there is disclosed a batcher control mechanism of the so-called "single material" type in which a separate weigh hopper is provided for each one of the materials and in which separate cut-off switch mechanisms are associated with the respective weigh hoppers, to cut off material flow at a predetermined weight. The present invention is directed toward a somewhat similar arrangement including an improvement in the cut-off switch mechanisms.

It is an object of the present invention to provide a batcher control mechanism and in particular a cut-off switch mechanism therefor which enables a higher order of weighing accuracy to be achieved than has been possible heretofore. More specifically, it is an object of the invention to provide a cut-off switch mechanism having contacts capable of controlling large amounts of electrical power but in which operation of the contacts imposes no loading effect upon the scale linkage. It is a related object of the invention to provide a cut-off switch mechanism of the above type utilizing control contacts which are operated during the course of movement of the scale linkage and in which the barest engagement of the contact surfaces is sufficient to trigger a retracting mechanism in order to disengage the contacts thereby to avoid any further loading effect upon the scale linkage. Stated another way, it is an object of the invention to provide a freedom from loading which equals that found in cut-off devices employing an interrupted light beam but which avoids photocells and other sensitive electronic elements and the attendant service problems normally associated with use of devices of the light beam type.

It is another object of the invention to provide an improved cut-off switch mechanism for use in a concrete weigh batcher which is sensitive and accurate but which, nevertheless, is capable of use under adverse field conditions and which retains its calibration over long periods of time in spite or rough usage, presence of shock or vibration, accumulation of dust or the like.

It is another object of the invention to provide cut-off switch mechanism which is more easily and quickly adjusted and maintained than devices which have been conventionally used. It is another object to provide a batcher control mechanism which operates reliably over long periods of time and with a minimum of "down" time enabling production of concrete which meets the highest specifications of accuracy and consistency from batch to batch.

It is a more specific object related to the foregoing to provide a cut-off switch mechanism capable of controlling large amounts of electrical power required to operate the discharge gates but in which the control contacts are subjected to minimum electrical loading, thereby avoiding the pitting and wear on such contacts and eliminating both the necessity for frequent dressing of the contacts and the recalibration which is usually required when contacts are dressed in devices of the present type.

In a broader aspect it is the object of the present invention to provide for automatic retraction between a pair of engaging control elements in order to prevent any loading effect upon a scale linkage as the control elements are brought into engagement with one another. While the devices disclosed herein are directed toward control by electrical means it is an object to provide an arrangement which is not limited to electrical control but which is applicable to other types of control without substantial change in the control elements.

It is an object of the invention, moreover, to provide a batcher control mechanism and particularly a cut-off switch mechanism therefor having a simple and non-critical control circuit.

It is an object of the invention in one of its aspects to provide a batcher control mechanism which is not only accurate but which is susceptible of embodiment in simple and inexpensive and compact structures, as indicated by the various embodiments described herein.

Other objects and advantages of the invention will become apparent upon reading the attached detailed description and upon reference to the drawings in which.

While certain preferred embodiments of an improved control mechanism have been described in the drawings and in the following specification, it will be understood that we do not intend to limit the invention to such embodiments but intend to cover all modifications and alternative constructions falling within the spirit and scope of the invention as expressed in the appended claims.

Figure 1:
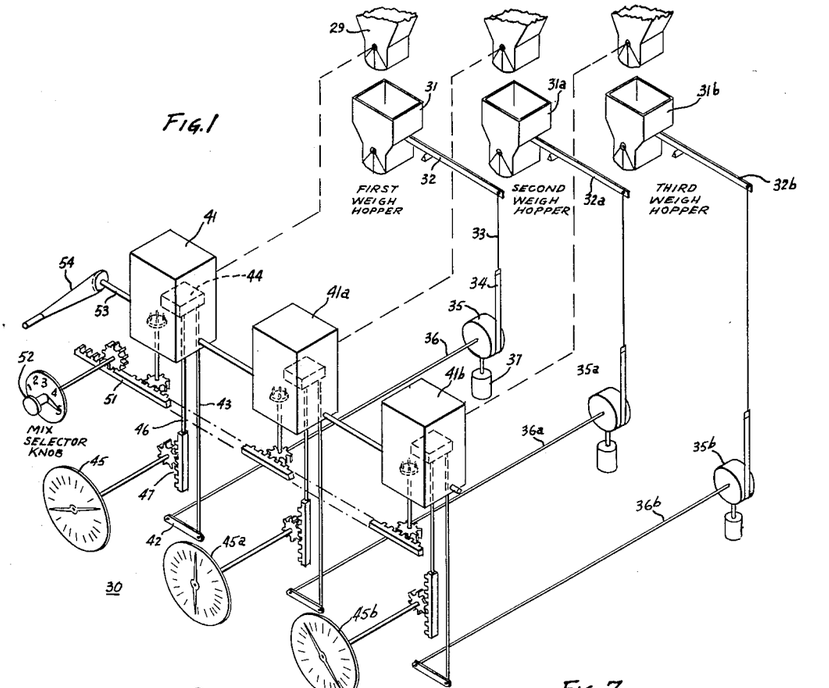
FIGURE 1 is a diagrammatic perspective of a batcher control mechanism employing a series of cut-off switch mechanisms constructed in accordance with the present invention.

Referring now to the drawings, FIG. 1 shows a batcher control mechanism 30 embodying the present invention. The showing in this figure is diagrammatic in order to facilitate understanding, reference being made to the prior Martinson patent for a more complete discussion of batcher control mechanisms of the single material type. Three weigh hoppers 31, 31a and 31b are provided for weighing three separate materials, for example, cement, sand and gravel. Associated with the weigh hopper 31 is a scale beam 32 and a cable 33. The end of the cable 33 is connected to a draft band 34 which is wound about a drum 35, the latter being mounted on a shaft 36 journaled in suitable bearings. Rigidly connected to the shaft 36 is a pendulum weight 37 which counterbalances the weight of the material in the hopper 31.

For the purpose of automatically cutting off flow of material into the weigh hopper 31 after a predetermined weight has been deposited in the hopper, a cut-off switch mechanism 41 is provided. This mechanism is described in detail below and it will suffice for the present to say that the mechanism is coupled to the weighing scale mechanism by means of a linkage which, in the present instance, includes a crank 42 and push rod 43. Coupled to the upper end of the push rod 43 is a control member 44 which moves vertically in response to the increasing weight of material deposited in the hopper, and the invention is especially directed toward the means for providing cut-off in response to the movement of the member 44. For the purpose of providing visual indication of the weight in the hopper 31, a dial indicator 45 is provided. Movement of the push rod 43 is transmitted to the dial 45 by means of a dial rod 46 having a rack and pinion connection 47 with the dial spindle, the upper end of the dial rod 46 being anchored in the vertically movable member 44.

The switch mechanisms, scale beams, linkages, and the dial indicators for the other materials are constructed as substantial duplicates and carry subscripts *a* and *b*, respectively.

Just as in the prior Martinson patent, means are provided for changing the proportions of ingredients measured out by the switch mechanisms prior to cut-off. The switch mechanisms are simultaneously acted upon by a rack 51 which is reciprocated between positions of adjustment by a mix selector knob 52. For the purpose of releasing the switch mechanisms prior to resetting the mix selector, a release shaft 53 is coupled to all of the mechanisms and is provided at one end with a suitable manual operator 54. The effect of operating the rack 51 and shaft 53 will become apparent as the discussion proceeds.

Figure 6:
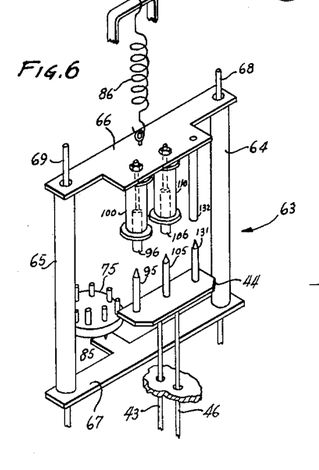
FIG. 6 is a diagrammatic perspective, partially distorted, and with certain parts omitted, for the purpose of facilitating understanding of the device shown in FIGS. 2–5.

The details of the switch mechanism 41 are shown in FIGS. 2-5 and in the diagrammatic perspective of FIG. 6. As shown in these figures, the mechanism has a frame including a base plate 60 and a vertical portion 61 which is topped by a bridge plate 62. Extending downwardly through apertures provided in the base plate 60 are the push rod 43 and the dial rod 46. As previously stated, the control member 44 thereon occupies a vertical position which depends upon the amount of material in the associated weigh hopper. Arranged above the control member 44 is a slidable carriage or subframe 63. This carriage includes tubular side members 64, 65 which are joined at the top by a bracket plate 66 and at the bottom by a bottom plate 67. The side members 64, 65 are telescoped over posts or guide rails 68, 69 extending vertically between the bridge plate 62 and base plate 60 so that the carriage may be freely positioned with respect to the frame.

Prior to discussing the operation of the control member 44, reference will be made to the means for locating the carriage 63 in a desired reference position. For this purpose, a rotatable turret 75 is used, mounted on a vertical shaft 76 which is journaled in the base plate or frame member 60. At its lower end, the turret 75 carries a pinion 77 for meshing with the rack 51 previously referred to. Spaced at equal intervals about the turret 75 are adjustable pins, twelve in number, the first three of these pins being indicated for convenience at 81, 82, and 83. Suitable lock nuts are provided for anchoring the pins in a desired position of adjustment.

For seating against a selected pin, the bottom plate 67 of the carriage includes an integral arm or extension 85, the carriage being pulled upwardly into seated position by means of a tension spring 86. In order to accommodate the tension spring, the bridge plate 62 is centrally grooved and provided with an upwardly extending U-shaped bracket 87. It will be apparent that with the turret 75 in a selected position, the carriage 63 will be maintained at a precise elevation which is determined by the adjustment of the pin in the turret.

For the purpose of releasing the carriage, i.e., for retracting the same downwardly away from the turret when it is desired to rotate a different turret pin into active position, an arm 90 is secured to the shaft 53, the outer end of the arm being connected to the carriage 63 by a link 91. Thus, when the shaft 53 is rocked counterclockwise by the operator 54 (FIG. 1), tension is applied to the link 91, pulling the carriage 63 downwardly against the force of the spring 86. Following selection of a different turret pin, the shaft 53 is released so that the carriage is free to return to a seated reference position.

In order to initiate the control function, i.e., the cut-off of the flow of material to the hopper when the control member 44 reaches the predetermined position in its path of movement, the control member 44 includes a control element 95 in the form of an upwardly extending, pointed post. Arranged in the path of movement of the control element 95 is a fixed control element 96. In the present instance, the control elements 95, 96 are in the form of electrical contacts which, acting through a control circuit to be described, causes closure of the fill valve feeding the associated weigh hopper.

Figure 2:
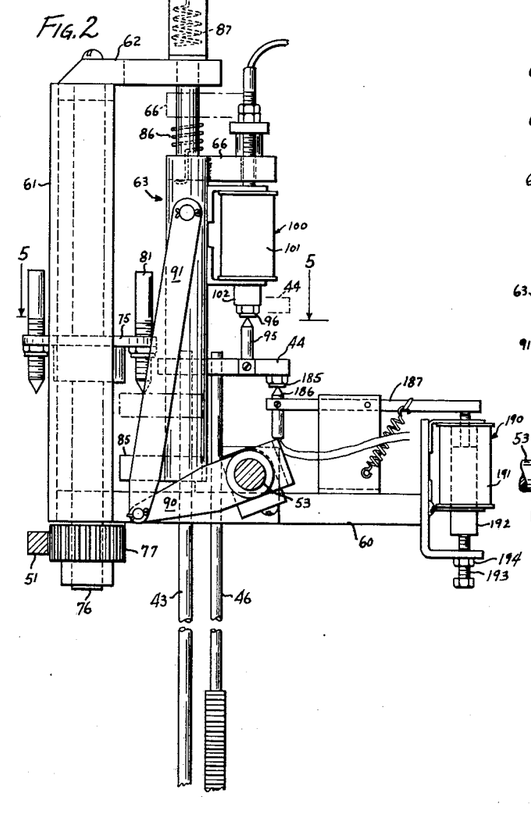
FIG. 2 is a side view showing a first embodiment of the improved cut-off switch mechanism.
Figure 3:
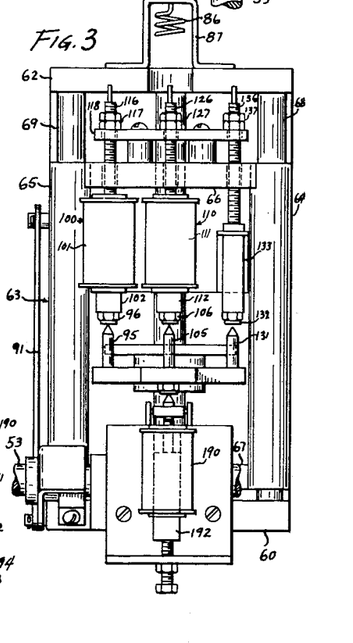
FIGS. 3 and 4 are front and top views, respectively, of the device shown in FIG. 2.
Figure 4:
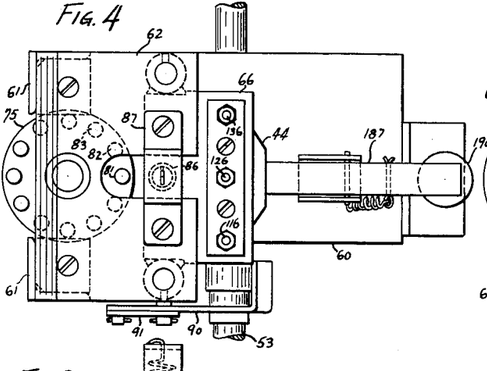
Figure 5:
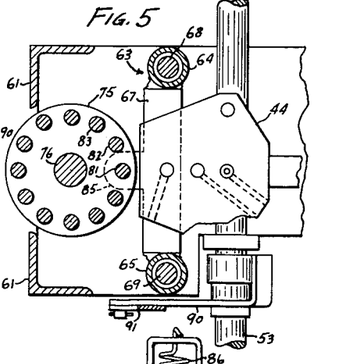
FIG. 5 is a transverse section taken along the line 5—5 in FIG. 2.

In accordance with the present invention, means are provided for not only cutting off flow of material upon touching of the elements 95 and 96, but also for retracting the element 96 into an out of the way position in which it is incapable of affecting the control member 44. In the present instance, this retraction is brought out by a solenoid 100 having a winding 101 and a vertically movable armature 102 on which the contact element 96 is mounted. The solenoid 100 is anchored to the carriage below the bracket plate 66 in an overhanging position as shown in FIG. 2, axially centered with respect to the element 95. Upon touching of the control elements an electrical circuit, to be described, is actuated, thereby energizing the solenoid winding and causing the armature 102 to be drawn upwardly out of the effective range of the movable control element 95. Since the retractable contact 96 moves much more rapidly than the scale control member 44, the retractable contact can never interfere with the normal operation of the scale system. Moreover the touch between the control elements is so slight and of such short duration that no discernible effect on the scale operation occurs.

In carrying out the invention, the first pair of contacts or control elements 95, 96 is preferably employed for producing the main cut-off of material flow. A second pair of control elements 105, 106 also actuated by the control member 44, are provided for producing final cut-off of the flow. The movable control element 106, as in the case of element 96, is arranged for retraction by a solenoid 110 having a winding 111 and an armature 112. For the purpose of adjusting the differential between the main cut-off and final cut-off, provision is made for individual adjustment of the normal or de-energized positions of the armatures 102, 112. In the case of the armature 102, a tail screw 116 is provided having adjusting nuts 117. The tail screw 116 is suspended on a horizontal stop member 118 of insulating material which is secured to the bracket plate 66, registering holes being provided in both of these members. The armature 112 of the companion solenoid is similarly fitted with a tail screw 126 having adjusting nuts 127 which rest upon the stop member 118.

Briefly stated, during the normal cycle of operation continued discharge of material into the weigh hopper 31, acting through the scale linkage and control member 44, results in engagement between the control elements 95, 96, causing retraction of the armature 102, accompanied by main cut-off of the flow. The control member 44, upon slight additional movement, produces engagement between the control elements 105, 106 resulting in final cut-off of the flow and retraction of the armature 112. The scale linkage is free of any artificial loading by the control elements and consequently it may be expected that the associated dial indicator 45 will indicate the accurate and desired weight. Actually, the scale linkage is free of any artificial loading by the control at all points except during the periods when 95 and 96 meet, and when 105 and 106 meet—and at those points the artificial loading is so small as to be quite indiscernible.

However, it sometimes happens that final closure of the gates from the storage hopper is delayed, for example, by obstruction due to an extra large piece of material. When this occurs, it is desirable that the operator be notified so that the material may be discarded as a preliminary to weighing out a fresh batch. In accordance with one of the aspects of the present invention, an auxiliary pair of control elements are provided and adjusted to come together whenever the scale linkage and the associated control member 44 move beyond the desired cut-off position. In the present instance, control elements 131, 132 are provided for this purpose, the element 132 being mounted on a plunger 133. The latter has a tail screw 136 and adjusting nuts 137 which normally bear against the stop member 118. The differential between exact weight and overweight may be adjusted by adjusting the nuts 137. For certain applications similar pairs of control elements can also be used for checking the measured weight. In this latter instance the retractable control elements will normally be held in their retracted position. Then after the normal weighing operation has been completed one or more of the retracted elements may be released to perform the functions described elsewhere in this specification.

Figures 8, 9:
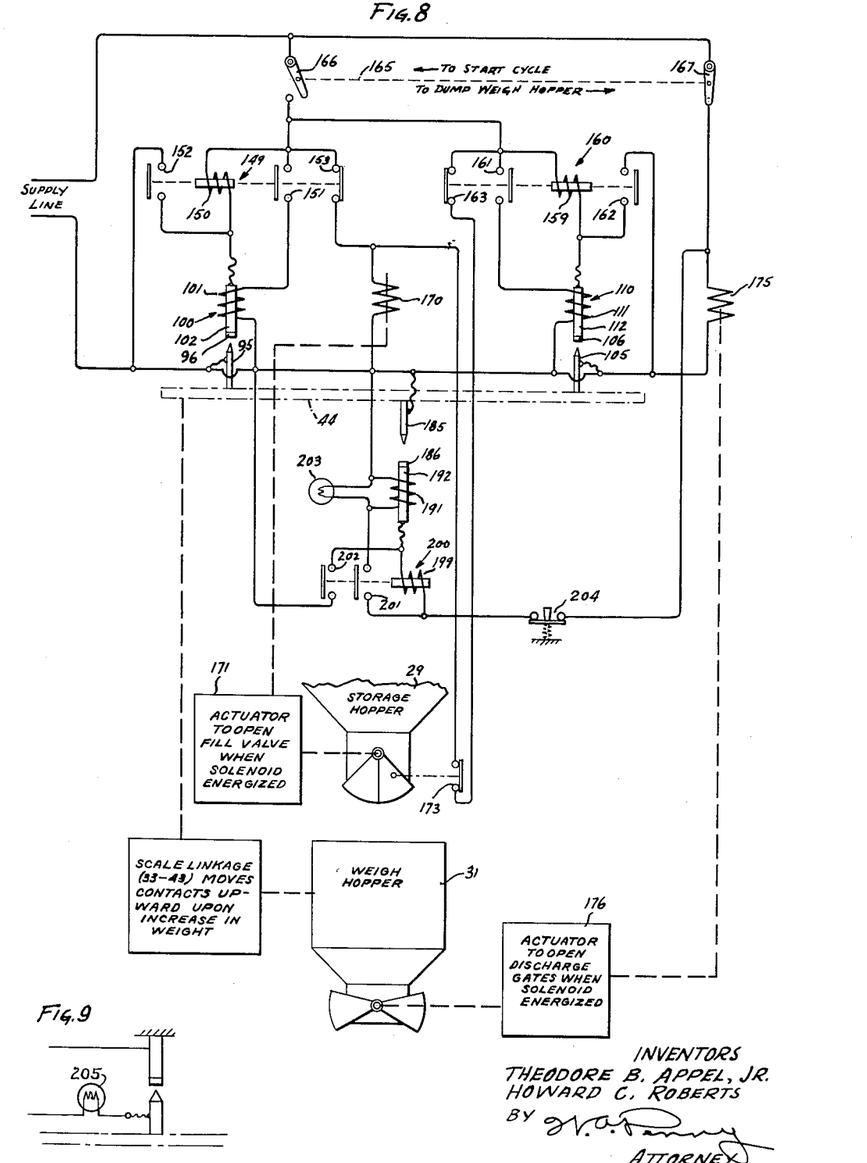
FIG. 8 is a schematic diagram of the control circuit showing the manner in which it is coupled to the gates of the storage and weigh hoppers.
FIG. 9 is a fragmentary circuit showing the overweight contacts and indicating lamp.

To understand the circuit used to close the gates of the storage hopper, commonly referred to as the fill valve, when the desired weight has been achieved, reference is made to FIG. 8. In this figure the vertically movable control member 44 is indicated by dot-dash outline and carries control elements 95, 105. Arranged above the latter are solenoids 100, 110 having windings 101, 111, all as previously described. Connected in series with the contacts 95, 96 is the coil 150 of a relay 149 having two sets of normally open contacts 151, 152 and a set of normally closed contacts 153. Connected in series with the contacts 105, 106 is the winding 159 of a relay 160 having normally open contacts 161, 162 and a set of normally closed contacts 163.

Operation of the circuit is initiated by a selector switch 165 which is of the single pole, double throw type having contacts 166, 167.

The output of the circuit serves to energize a solenoid 170 which controls a suitable actuator 171 to open the fill valve when the solenoid 170 is energized. Associated with the fill valve is a jog switch 173 which is closed when the fill valve is closed, and the operation of which will become clear as the discussion proceeds. The control circuit also actuates a solenoid valve 175 controlling an actuator 176 for the purpose of opening the discharge gates of the weigh hopper 31 when the solenoid is energized.

It will be understood that a circuit equivalent to FIG. 8 is used for each of the devices 41, 41a and 41b.

With the circuit arranged as shown and with the selector switch 165 in the righthand position, the gates of the weigh hopper 31 will be open as indicated. In order to begin the weighing cycle the selector switch is moved to the left hand position. This simultaneously opens the circuit to solenoid 175 and closes the circuit to the solenoid 170 through normally closed contacts 153. This causes, respectively, closure of the discharge gates and opening of the fill valve associated with the the storage hopper 29 so that material flows from the storage hopper 29 to the weigh hopper 31. The progressive increase in the weight of material in the weigh hopper, acting through the scale linkage 33—43 causes the control member 44 to move upwardly until contact takes place between the contact elements 95, 96, as shown in the "touch" position in FIG. 7. This energizes the coil of the relay 150 causing closure of contacts 151, 152, completing a circuit parallel to that through contacts 95 and 96.

Figure 7:
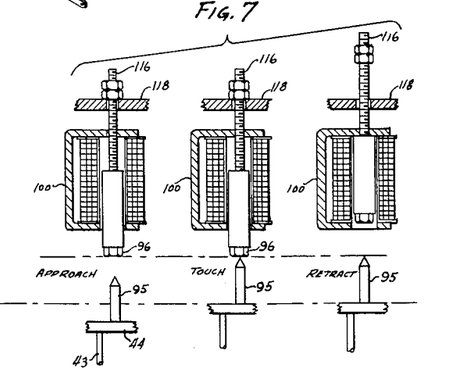
FIG. 7 is a stop motion diagram showing the operation of one of the solenoids in FIG. 6.

The closure of contacts 151 energizes the solenoid 100 causing its armature 102 to be retracted into its out-of-the-way position, shown at "retract" in FIG. 7, opening the contacts 95 and 96 from which the current has already been transferred to the contacts 152. The closure of contacts 152 also causes the relay 149 to be "locked in" until the circuit is restored to its initial condition by opening of the contacts 173.

Simultaneously, with the above, the relay contacts 153 are opened, thereby opening the circuit to the solenoid 170 which, acting through the actuator 171, causes the gates of the storage hopper 29 to close, the latter operation constituting the main cut-off.

Jogging, in other words, rapid opening and closing, of the gates of the storage hopper takes place, however, by reason of the jog switch 173 which supplies current to the solenoid 170 via contacts 163 on the relay 160, notwithstanding the fact that the contacts 153 are open. As a result of this jogging, additional material is added at a low rate to the weigh hopper, causing slow upward movement of the control member 44. This finally results in closure of the contacts 105, 106 so that the relay 160 is energized. The relay 160 is locked in by the contacts and the resulting closure of the contacts 161 retracts the armature 112 to its out-of-the-way position. The opening of contacts 163 opens the circuit of the jog switch 173 thereby completely de-energizing the solenoid 170 to produce final cut-off of material flow.

To dump the material in the weigh hopper the switch 165 is moved to its righthand position, thereby energizing the solenoid 175 and causing the actuator 176 to open the weigh hopper gates. This restores the circuit to the condition shown in FIGURE 8.

In accordance with one of the further aspects of the invention, means are provided for indicating the return of the control member 44 to the zero or reference position, thereby giving the operator notice that all of the material has been successfully discharged from the weigh hopper while preventing any effect upon the accuracy of the zero setting or indication. This is accomplished in the present instance by providing a pair of auxiliary control elements 185, 186 in the form of electrical contacts. The contact 185 is secured to the underside of the control member 44. For the purpose of retracting the contact 186 after the contacts initially touch, the contact 186 is mounted on a lever 187 which is centrally pivoted and which is operated by a solenoid 190 having a coil 191 and an armature 192. The armature is supported in an adjusted position by means of an adjusting screw 193 having a lock nut 194. A signalling circuit which may be used with the contacts 185, 186 is shown at the center of FIG. 8. Here it will be noted that a relay 200 is provided having a winding 199, a first pair of normally open contacts 201, and a second pair of normally open contacts 202. A signal lamp 203 is arranged in parallel to the solenoid winding to indicate the zero return condition. It will be apparent to one skilled in the art that the invention is not limited to use of a signal lamp at this point, and that a conventional interlock may, if desired, be provided in the lamp circuit and arranged to prevent re-cycling, as, for example, by preventing operation of the switch 155 as long as this circuit is energized, without departing from the present invention.

In operation, momentary touching of the contacts 185, 186 causes the winding of the relay 200 to be energized, closing the contacts 201, 202. Closure of the contacts 202 serves to lock in the relay 200. Closure of the contacts 201 energizes the solenoid 190, retracting the contact 186 and simultaneously lighting the lamp 203. This indicates to the operator that the weigh hopper is completely empty, and because of the retraction of the contact 186 the scale linkage and dial indicator are free to assume their exact "zero" position. Complete discharge of all of the weigh hoppers is, in the practical case, indicated by lighting of an entire row of lamps, one for each material. In order to turn off the lamp 203 incident to starting the next weighing cycle, the zero indicator circuit in FIG. 8 is preferably energized via the dump contacts 167 through a lead 204, opening of the dump contacts serving to drop out the relay 200.

Since the power flow is controlled by relays associated with the solenoids, the only current which is required to flow through the sensitive contacts is the small current required to close the relay. At voltages on the order of 110 volts such current is a matter of only a few milliamperes. Consequently, the sensitive contacts are practically unaffected by the current flow and are not subject to pitting or wear. This not only reduces maintenance costs but also makes it possible for accurate calibration to be retained for an indefinite time. The voltage of 110 volts is used in order to insure contact in spite of the collection of dust or in spite of the presence of a thin layer of oxide on the contact surfaces. Any other convenient voltage may be used depending upon the contact materials, the elements of control circuitry and the accuracy desired.

In the normal cycle of operations described above the overweight contacts 131, 132 on the control member 44 are not engaged. However, as previously stated, it occasionally happens, particularly in the case of large aggregates, that a piece of aggregate will be caught between the gates thus preventing prompt closure and allowing an additional trickle of material into the weigh hopper. To signal this overweight condition to the operator the simple control circuit shown in FIG. 9 may be used, an indicator lamp 205 simply being connected in series with the overweight contacts.

*Modified Arrangement Using Rotary Solenoids*

In the embodiment described above, straight line solenoid action is utilized. In the alternative arrangement to be described a slightly different arrangement is used, employing so-called "rotary solenoids" in which the adjustable contact element is retracted along an arcuate path. The features and advantages resulting in this arrangement will become apparent as the discussion proceeds. One of the primary advantages is the greater compactness which the rotary solenoids afford as well as the retraction of the contact elements laterally as well as axially from the path of movement of the movable contact elements mounted on the control member.

Referring to FIGS. 10-13, the cut-off switch mechanism indicated at 210 has a base plate 211 and a top plate 212 supported by a pair of brackets 212a. Extending through the base plate 211 are a push rod 213 and a dial rod 215 corresponding to the rods 43, 46 previously mentioned. Mounted at the top of the push rod 213 is a control member 214. The latter controls the actuation of a pair of control elements 221, 222 which control the main cut-off of material flow and contacts 223, 224 which control final cut-off. A third pair of contacts 225, 226 are provided for signaling the overweight condition. Prior to discussion about the solenoids used for actuating the contacts 222, 224, reference will be made to the carriage and turret mechanism.

In the present instance, the carriage indicated at 230 includes a pair of tubular side members 231, 232 joined by a top plate 233 and by a bottom plate 234. The tubular side members are telescoped respectively on guide rails 236, 237 which extends vertically upward from the base plate. Arranged between the two guide rails and secured to the top plate 233 is a stop member 239 (FIG. 11) in the form of an upwardly extending pedestal. This pedestal extends through a suitable opening provided in the frame member 212.

For the purpose of locating the carriage at a desired elevation a turret 240 is provided in the form of a sector-shaped member swingably mounted for rotation on a horizontal shaft 241 which is journaled in a pair of spaced bracket plates 243, 244. Provision is made at the periphery of the turret 240 for the mounting of twelve radially extending stop pins, the first three of the pins being indicated for convenience at 251, 252, and 253. In order to urge the carriage 230 upwardly into a seated position relative to a selected stop pin, a pair of springs 254, 255 are provided. It will be apparent to one skilled in the art that the turret 240 thus performs a function which is analogous to the turret in the previous embodiment.

Attention may next be given to the construction and mounting of the rotary solenoids, indicated at 261, 262 on the carriage 230. The first solenoid 261 is of cylindrical shape having its rear end mounted on a vertical mounting plate 263 secured to the carriage 230.

A screw and slot arrangement indicated at 264 is provided for the purpose of vertically adjusting the solenoid relative to the carriage. The rotary solenoid has a forwarding extending shaft 265 mounting a contact arm 266 which is of inverted L-shape and which carries contact element 222 at its outer end. The solenoids are of the type manufactured by G. H. Leland, Inc., of Dayton 2, Ohio, and marketed under the trade name of Ledex. For further information regarding the internal construction, reference is made to trade literature published by the manufacturer, a copy of which is being filed concurrently herewith. It will suffice to say that the construction includes an annular winding providing annular magnetic poles which act upon a circular disc of magnetic material to which the central shaft is secured. The axial attractive movement is converted into rotary motion by spaced balls riding in inclined ball races. A spring is included for restoring the armature to its normal position when the solenoid is deenergized. Since the mass of the moving elements is relatively small compared to the forces involved, the shaft moves through its range of movement with extreme rapidity, insuring prompt retraction of the stationary contact and minimum interference with the vertical movement of the control member 214 connected to the scale linkage.

The companion solenoid 262 is constructed and mounted in similar fashion having a mounting plate 267, a shaft 268 and an L-shaped contact arm 269, which is a mirror image of the arm 266.

For the purpose of mounting the overweight contact element 226 an arm 270 is provided which is arranged for rotation about a pivot 271 on a bracket 272. The normal position of the arm 270 is adjustable by means of an adjusting screw 273 having a lock nut 274, the adjustment of the screw determining the overweight differential.

Figures 10, 13:
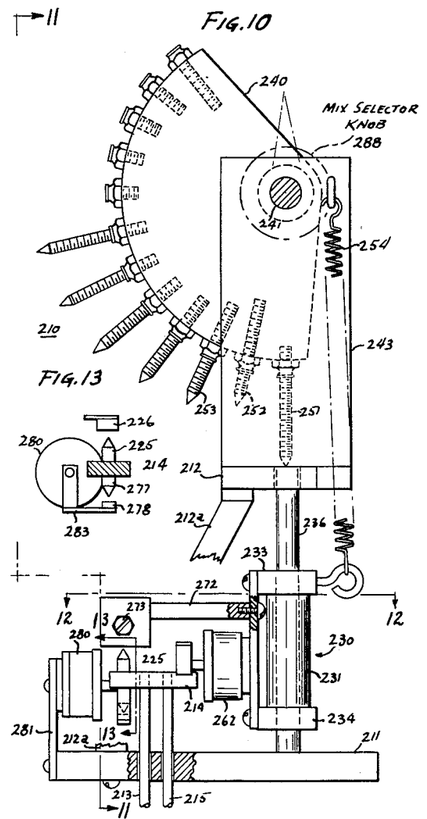
FIG. 10 is a side view of a modified form of the present invention employing so-called rotary solenoids with parts broken away to reveal details of construction.
FIG. 13 is a fragmentary section taken along the line 13—13 in FIG. 10.

For the purpose of providing an accurate indication of zero return, a control element 277 is provided on the underside of the control member 214. Arranged in the path of movement of this control element is a second control element 278 arranged for retraction by a rotary solenoid 280 mounted on an outboard bracket 281. The solenoid 280 has a shaft 282 mounting an L-shaped arm 283 (FIG. 13).

With regard to the operation of the cut-off switch mechanism 210 as just described, it will be understood that the solenoids and contact elements are connected in a control circuit corresponding to FIG. 8 previously described. As the control member 214 moves vertically upon discharge of material into the weigh hopper, a point is reached in which contact elements 221, 222 are brought together. This causes closure of the associated relay which energizes the associated rotary solenoid 261 retracting the contacts 222 into retracted position and resulting in the main cut-off. Slight continued movement of the control member 214 causes similar operation of the solenoid 262 (FIG. 14) to produce final cut-off. After the weigh hopper has been discharged, the lowering of the control member 214 causes contact between the elements 277, 278 thus indicating to the operator that the cycle is complete.

When it is desired to switch to another mix, all of the carriages in the respective switch mechanisms are retracted. Such retraction may be accomplished by providing a retracting mechanism including a shaft, crank and link arrangement exactly the same as in the earlier embodiment. Furthermore, the shaft 241 on which the turret 240 is mounted may be extended to engage the turrets of all of the contact mechanisms under the control of a suitable knob or manual control 288.

It is noted that in the arrangement just described the solenoids are all laterally offset with respect to the control member 214. This not only makes for efficient utilization of space and more compact construction but it insures that the stationary contact elements are retracted completely out of the path of the control member. Furthermore, the unit just described is susceptible of more economical construction since there is no necessity for a rack and pinion turret operator and since the mounting and adjustment of the solenoids may be much more simply accomplished. The accuracy is comparable to that achieved in the first embodiment described above.

Figure 15:
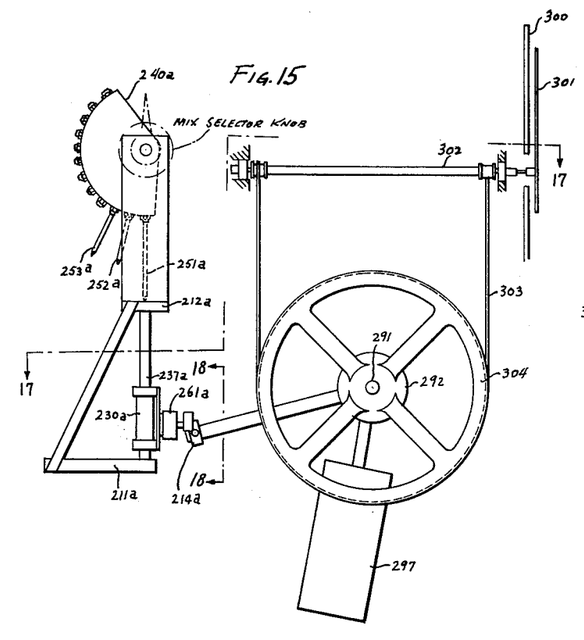
FIG. 15 is a side view of still another form of the present invention.
Figure 16:
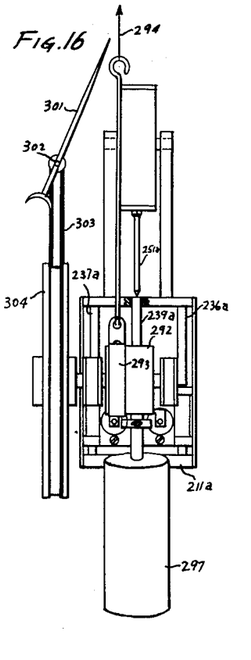
FIG. 16 is a front view of the device shown in FIG. 15.
Figure 17:
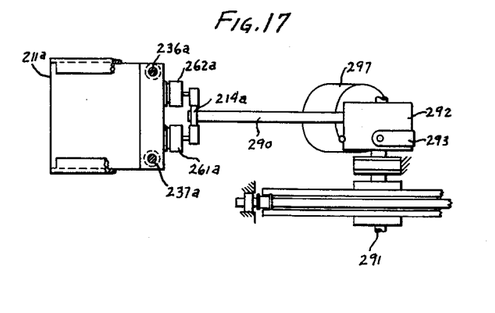
FIG. 17 is a top view of the same device taken along the line 17—17 in FIG. 15.
Figure 18:
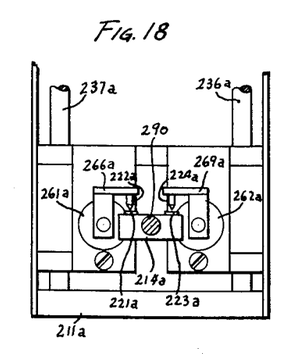
FIG. 18 is a front section taken along the line 18—18 in FIG. 15.

The concept of retraction may be applied even more economically to an arrangement shown in FIGS. 15–18 in which the control member carrying the contact elements is mounted directly upon the counterweight shaft without any linkage being interposed. Referring to FIG. 15 the switch mechanism has a frame and turret arrangement which is quite similar to that used in the preceding embodiment. A base plate 211a is provided carrying a frame plate 212a mounting a carriage 230a which is vertically slidable on guide rails 236a, 237a. The carriage 230a is positioned by means of a turret 240a having pins 251a, 252a, 253a, all of which are engageable with a stop member 239a. Mounted on the carriage are two rotary solenoids 261a, 262a.

In carrying out the present invention, the control member 214a is mounted at the end of an arm 290 rigidly secured to a shaft 291. Mounted on the shaft 291 is a drum 292 about which is wound a draft band 293 which is coupled to the weigh hopper by a cable 294.

In order to counterbalance the weight in the weigh hopper a pendulum 297 is used so that the shaft 291 rotates progressively for increasing weight.

To provide visual indication of the weight a dial 300 is employed, having a pointer 301 mounted on a spindle 302. The spindle 302 is coupled to the shaft 291 by means of a cord 303 which is wrapped about the ends of the spindle (FIG. 15) and trained about a pulley 304 which is mounted on the shaft 291.

Figure 11:
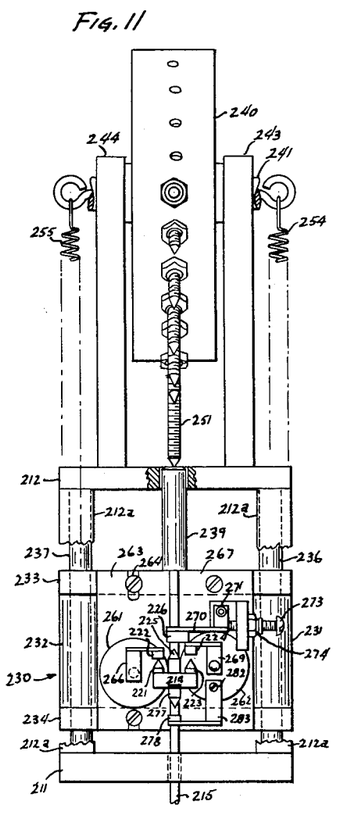
FIG. 11 is a front section taken along the line 11—11 in FIG. 10 and with certain parts omitted.
Figure 12:
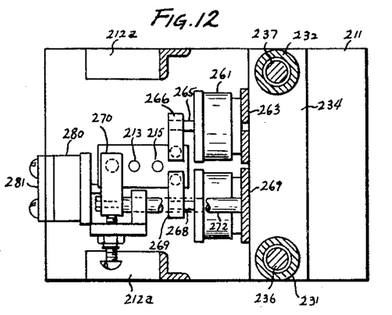
FIG. 12 is a horizontal section taken along the line 12—12 in FIG. 10.

In discussing the portion of the device shown in FIG. 15, it will be understood that the control member 214a cooperates with control elements 221a, 222a and 223a, 224a corresponding to the control elements of the embodiment shown in FIG. 11. A progressive increase in weight causes a control arm 290 to swing clockwise as viewed in FIG. 15 thereby bringing into engagement the contact elements 221a, 222a resulting in the immediate retraction of the contact 222a to produce the main cut-off. Shortly thereafter, contact 223a is brought into engagement with the contact 224a causing retraction of the latter contact and resulting in final cut-off of the flow. It will be apparent to one skilled in the art that, due to the simplicity of the arrangement, the play normally associated with scale linkage is almost completely absent so that a high order of accuracy may be achieved at minimum expense. For still further simplicity, the overweight indicator and zero return indicator of the previous embodiment has been omitted.

Figure 19:
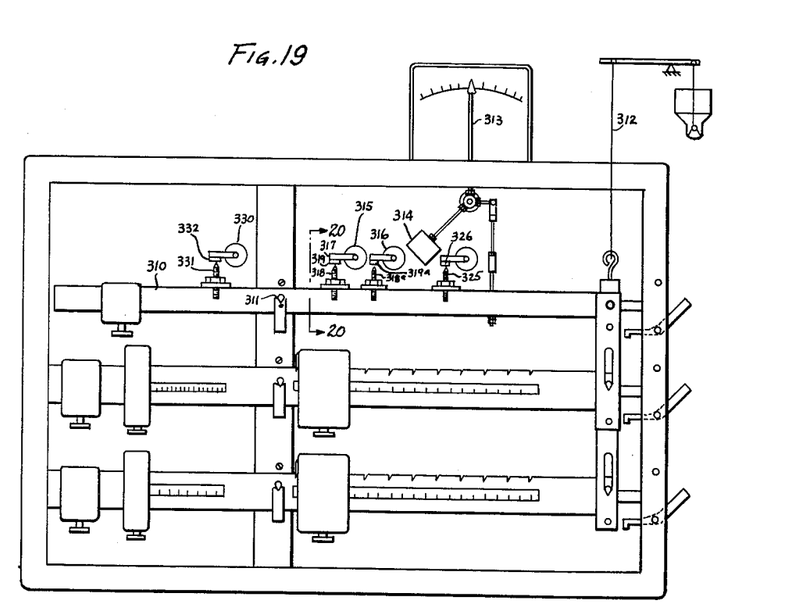
FIG. 19 shows the invention applied in one of its aspects to a beam box type of weighing mechanism.

The invention has been discussed above in connection with a number of embodiments employing a pendulum type of weighing mechanism. The invention in its broader aspects is not, however, limited to use with this type of mechanism but is equally applicable for use with the beams in a conventional beam box. Such an arrangement is shown in FIG. 19. In this figure, a beam 310 is centrally pivoted at 311 and is coupled to an associated weigh hopper by means of a cable 312. Coupled to the beam 310 is a conventional over-under indicator having a pointer 313 and a pendulous counterweight 314.

Figure 14:
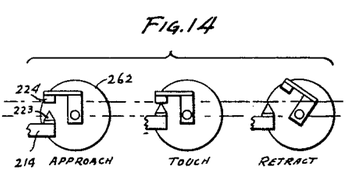
FIG. 14 is a diagram showing the successive steps in the operation of a rotary solenoid.

Mounted on the back wall of the beam box is a first rotary solenoid 315 for main cut-off and a second rotary solenoid 316 for final cut-off. The solenoid 315 has an L-shaped arm 317. Mounted on the scale beam is a control element or contact 318 which cooperates with a fixed control element 319. Preferably the control element 318 is in the form of a threaded stud pointed at its upper end and vertically adjustable with respect to the beam 310. A lock nut 320 is preferably provided for locking the element 318 in the desired position of adjustment. Corresponding structure is used in the case of the solenoid 316 including an adjustable contact element 318a and a fixed contact element 319a. It will, furthermore, be understood that the contact elements are connected in a control circuit as shown in FIG. 8. Thus, upon progressive tilting of the beam 310, main and final cut-off of material flow is achieved. The arrangement shown in FIG. 14 is particularly advantageous since the sensitivity and accuracy of a particular set of control elements may be varied simply by varying the distance of the control elements from the fulcrum of the beam. In the arrangement shown in FIG. 19 the final cut-off will be determined with a higher order of accuracy than the main cut-off, which is desirable.

The embodiment shown in FIG. 19 furthermore includes provision for signalling the overweight condition. Mounted on the beam 310 is a movable control element 325 which cooperates with the fixed control element 326. The movable control element is adjusted relative to the beam so that the contacts engage only upon existence of a predetermined degree of overweight, the associated circuit being that shown in FIG. 9.

Figure 20:
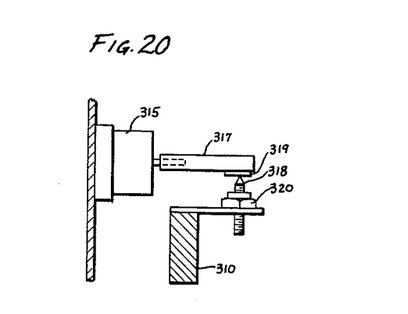
FIG. 20 is a section taken along the line 20—20 of FIG. 19.

The embodiment further includes a zero return indicator including a rotary solenoid 330, a movable contact element 331 mounted on the beam and a fixed, i.e., retractable, contact element 332. The arrangement shown in FIGS. 19 and 20 is advantageous not only because of the available sensitivity feature but also because very little modification of the standard beam box is required, permitting automatic control at minimum expense.

We claim:

1. In a control mechanism for use with a weighing scale having a source of material together with means for controlling discharge of material from said source onto said scale and having conditions of main cut-off and final cut-off respectively, the combination comprising a frame, a movable weight responsive member coupled to the scale for movement in response to progressive discharge of material onto said scale, a carriage slidably mounted on the frame in a direction parallel to the movement of the weight responsive member, stop means for positioning the carriage in a desired reference position, a first control element arranged on said carriage in the path of movement of the weight responsive member, means responsive to engagement of said control element with said weight responsive member for simultaneously effecting main cut-off of the flow of material and for retracting the first control element to an out-of-the-way position, a second control element arranged on said carriage in the path of movement of the weight responsive member for engagement by the latter upon slight additional movement, means responsive to the engagement of the second control element for simultaneously effecting final cut-off of material and for retracting the second control element to an out-of-the-way position.

2. In a control mechanism for use with a weighing scale having a source of material together with means for controlling discharge of material from said source onto said scale and having conditions of main cut-off and final cut-off respectively, the combination comprising a frame, a movable weight responsive member coupled to the scale for movement in response to the weight on the scale, a carriage slidably mounted on the frame in a direction parallel to the direction of movement of the weight responsive member, stop means for positioning the carriage in a desired reference position, first and second solenoids on said carriage, first and second control elements movable by the armatures of said solenoids in the path of movement of the weight responsive member, means responsive to engagement of the first control element by the weight responsive member for simultaneously effecting main cut-off of the flow of material and for operating the first solenoid to retract the control element thereon to an out-of-the-way position, and means responsive to the engagement of the second control element upon addition of an increment of weight for simultaneously effecting final cut-off of material and for operating the second solenoid to retract the control element thereon to an out-of-the-way position.

3. In a control mechanism for use with a weighing scale together with a source of material and means for controlling discharge of material onto said scale and having conditions of main cut-off and final cut-off respectively, the combination comprising a movable weight responsive member arranged for coupling to the scale for movement in response to progressive discharge of material onto said scale, a first control element arranged in the path of movement of the weight responsive member, first retraction means operatively connected with said first control element and energizable upon engagement of said first control element with said weight responsive member to retract said first control element into an out-of-the-way position relative to said weight responsive member, means responsive to engagement of said first control element with said weight responsive member for simultaneously effecting main cut-off of the flow of material and energizing said first retraction means, a second control element arranged in the path of movement of the weight responsive member for engagement by the latter upon slight additional movement of the weight responsive member second retraction means operatively connected with said second control element and energizable upon engagement of said second control element with said weight responsive member to retract said control element into an out-of-the-way position relative to said weight responsive member, and means responsive to the engagement of the second control element with said weight responsive member for simultaneously effecting final cut-off of material and for energizing said second retraction means.

4. In a control mechanism for use with a weighing scale having means for cutting off flow of material onto said scale and having means for discharging said scale, the combination comprising a movable weight responsive member coupled to the scale for movement in accordance with the weight of material on the scale, a cut-off control element arranged in the path of movement of the weight responsive member, means responsive to engagement of the latter for operating the cut-off means, a zero indicator control element arranged in the path of reverse movement of said weight responsive member which takes place incident to discharging the scale and so arranged that engagement takes place when the weight on the scale is reduced to zero, retraction means coupled to said zero control element and responsive to such engagement for moving said zero control element into an out-of-the-way position, and means simultaneously responsive to such engagement for supplying remote indication thereof.

5. In a control mechanism for use with a weighing scale having means for cutting off flow of material to said scale and having means for discharging said scale, the combination comprising a movable weight responsive member coupled to the scale for movement in accordance with the weight of material on the scale, a cut-off control contact arranged in the path of movement of the weight responsive member, first retraction means operatively connected with said cut-off control contact and responsive to engagement of said cut-off control contact and said weight responsive member to retract said cut-off control contact into an out-of-the-way position, means simultaneously responsive to said engagement for actuating cut-off means, a zero indicator control contact arranged in the path of reverse movement of said weight responsive member which takes place when the weight on the scale is reduced to zero, second retraction means operatively connected with said zero indicator control contact and responsive to engagement of said zero indicator control contact and said weight responsive member to retract said zero indicator control contact into an out-of-the-way position, and means simultaneously responsive to said latter engagement for supplying remote indication thereof.

6. In a control mechanism for use with a weigh hopper and having a storage hopper provided with power actuated discharge gates for progressively discharging material into the weigh hopper, the combination comprising hopper counterbalancing means including a pendulum shaft and a pendulum mounted thereon, means for coupling the pendulum shaft to the weigh hopper, an arm on said pendulum shaft having a control element on the outer end for movement therewith, a fixed control element mounted in the path of movement of the movable control element, means responsive to engagement between the control elements for shutting the gates of the storage hopper, and means simultaneously responsive to said engagement for bodily retracting the fixed control element out of the path of movement of the movable control element.

7. In a control mechanism for use with a weighing scale having a movable weight responsive member and having a storage hopper provided with power actuated discharge gates for progressively discharging material onto the scale, the combination comprising a main control element, a final control element, a control member coupled to the weight responsive member for movement therewith and so arranged that said control member engages the main and final control elements in sequence, means responsive to the engagement of the control elements for operating the gates of the storage hopper to produce main and final cut-off respectively, and means responsive to engagement of a control element for retracting such control element out of the path of movement of the control member.

8. In a control mechanism, a movable member; a first control element; a second control element connected for movement by said movable member, said first and second control elements being positionable so that they come into engagement when said movable member is moved to a position corresponding to a preselected condition; and means movable independently of said movable member for retracting without movement of said movable member one of said control elements from engagement with the other upon the effecting of their engagement by said movable member, whereby said movable member may be moved to or past said position without the interference which would be occasioned by the continuing engagement of said control elements.

References Cited in the file of this patent

UNITED STATES PATENTS

| | | |
|---|---|---|
| Re. 20,141 | Bliss | Oct. 27, 1936 |
| 2,109,534 | Johnson | Mar. 1, 1938 |
| 2,132,237 | Haegele | Oct. 4, 1938 |
| 2,158,795 | Grubelic | May 16, 1939 |
| 2,178,765 | Thorsson | Nov. 7, 1939 |
| 2,193,594 | Johnson | Mar. 12, 1940 |
| 2,199,010 | Robb | Apr. 30, 1940 |
| 2,293,518 | Moyle | Aug. 18, 1942 |
| 2,346,121 | Weckerly | Apr. 4, 1944 |
| 2,544,155 | Harkenrider | Mar. 6, 1951 |
| 2,559,307 | Martinson | July 3, 1951 |
| 2,617,866 | Ballantine | Nov. 11, 1952 |
| 2,664,260 | Saxe | Dec. 29, 1953 |
| 2,699,068 | Tandler | Jan. 11, 1955 |